June 23, 1925.
L. W. HOTTEL
BATTERY BOX HANDLE
Filed Feb. 9, 1925
1,543,160
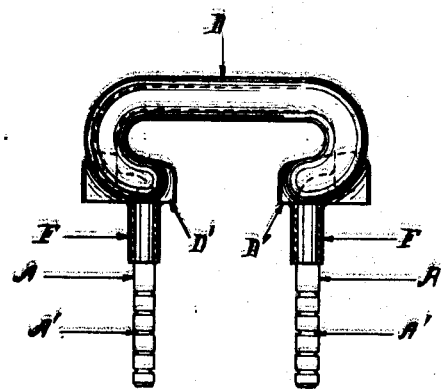
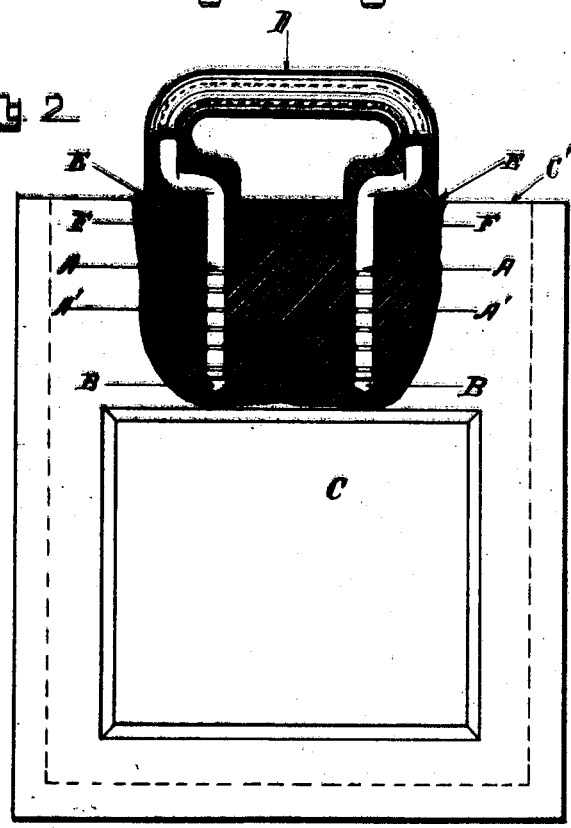
Inventor
Louis W. Hottel
By H. W. Sturgeon
atty.

Patented June 23, 1925.

1,543,160

UNITED STATES PATENT OFFICE.

LOUIS W. HOTTEL, OF ERIE, PENNSYLVANIA, ASSIGNOR TO M. LIEBEL, JR., OF ERIE, PENNSYLVANIA.

BATTERY-BOX HANDLE.

Application filed February 9, 1925. Serial No. 7,877.

*To all whom it may concern:*

Be it known that I, LOUIS W. HOTTEL, a citizen of the United States, residing at Erie, in the county of Erie and State of Pennsylvania, have invented certain new and useful Improvements in Battery-Box Handles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to battery boxes, and the object thereof is to provide a lifting handle therefor in which the metallic reinforce for such handle is provided with insulation means by means whereof the acid contained in said box cannot seep into the joint between said handle and come into contact with said metallic reinforce.

The features of my invention are hereinafter described and pointed out, and are illustrated in the accompanying drawings in which:

Figure 1 is a side elevation of a battery box handle, embodying my invention,

Figure 2 is an end elevation of a battery box with a portion of the wall thereof broken away, showing my invention in place thereon.

In these drawings A, A, indicates the arms of a metallic rod, bent into a loop form, as indicated by broken lines, the end portions thereof being provided with serrations A', adapted to receive cement when inserted into holes B, B, drilled in the body of the wall of the box C, see Fig. 2.

The loop portion of the reinforcing rod A is covered with an insulating material D which is placed thereon in plastic condition, the lower ends of said plastic material terminating in shoulders D', adapted to seat upon the upper edge C' of the box C, forming a joint E therewith.

In order to prevent acid from the interior of the box, which may get upon the flat upper edge C' of the wall of the box from seeping into the joint E under the shoulder D' of the handle, and thence coming into contact with the arms A of the reinforcing rod, I provide sleeves F, F, which are integral with the material of the shoulders D', and extend downward therefrom and cover said arms A, and when in place as shown in Fig. 2, extend into the holes B, drilled into the wall of the box, a portion of the length of said arms. The insulating material D, shoulders D' and sleeves F are moulded and vulcanized on the reinforcing rod A, and the handle is put in place by placing cement in the holes B, and pressing the arms A of the handle and the sleeves F into said holes, until the shoulders D' are firmly seated upon the upper edge C' of the box, the sleeves F forming a union with the interior surface of the holes B, so that any springing of the handle loop will not cause it to become loosened therefrom.

Having thus fully described the construction and operation of my invention so that others can utilize the same, what I claim as new and desire to secure by Letters Patent is:

1. In a battery box having vertical holes in the wall thereof, a metallic reinforcing loop, parallel arms on said loop, insulating material covering said handle, and terminating in shoulders, and sleeves of insulating material integral with said shoulders and covering a portion of said arms, said arms and sleeves adapted to be inserted into said vertical holes.

2. In a battery box having vertical holes in the wall thereof, a metallic loop having parallel arms thereon inserted in said vertical holes, insulating material on said metallic loop, shoulders on said insulating material and engaging the upper edge of the wall of said battery box, and insulating sleeves integral with said shoulders and covering a portion of said parallel arms and extending downwardly into said holes.

In testimony whereof I affix my signature.

LOUIS W. HOTTEL.